United States Patent [19]

Harter

[11] Patent Number: 4,957,006
[45] Date of Patent: Sep. 18, 1990

[54] MULTIPLE ORIFICE FLOW MEASURING DEVICE

[76] Inventor: James B. Harter, 1502 W. Broadway, Phoenix, Ariz. 85041

[21] Appl. No.: 441,766

[22] Filed: Nov. 27, 1989

[51] Int. Cl.$^5$ .............................................. G01F 1/42
[52] U.S. Cl. ................................. 73/861.62; 138/45
[58] Field of Search ........................ 73/861.62; 138/45

[56] References Cited

U.S. PATENT DOCUMENTS

| | | |
|---|---|---|
| 1,813,100 | 7/1931 | Swindle . |
| 2,626,820 | 1/1953 | Dons et al. ........................... 285/122 |
| 2,891,579 | 6/1959 | Burkland et al. ...................... 138/45 |
| 2,949,764 | 8/1960 | Knauth ..................................... 73/3 |
| 3,026,727 | 3/1962 | Spurling ........................... 73/861.62 |
| 3,037,384 | 6/1962 | Good . |
| 3,079,796 | 3/1963 | Freudenthal et al. . |
| 3,136,341 | 6/1964 | Walker et al. ......................... 138/45 |

Primary Examiner—Herbert Goldstein
Attorney, Agent, or Firm—Cahill, Sutton & Thomas

[57] ABSTRACT

A multiple orifice flow measuring device includes a housing having a central passage and a shaft passage located above and parallel to the central passage. The central passage contains a pipe adapted to be connected to a gas flow line. Mounted in the shaft passage is a shaft, on which is rotatably mounted a disk having a plurality of orifices of various diameters spaced circumferentially about the disk and selectively registerable in the flow passage of the pipe. Closely fitting around the pipe against the disk is a piston having a annular recess. A spring located in the central passage between the piston and the end of the housing opposite the disk forces the piston against the disk, thereby maintaining it in position. A lever extending from outside the housing into the piston annular recess is pivotally mounted to the housing so that when gas flow is shut off and the outside end of the lever is moved towards the disk, the end of the lever located within the annular recess pushes the piston away from the disk, compressing the spring, thereby releasing the disk for rotation to a different diameter orifice.

15 Claims, 3 Drawing Sheets

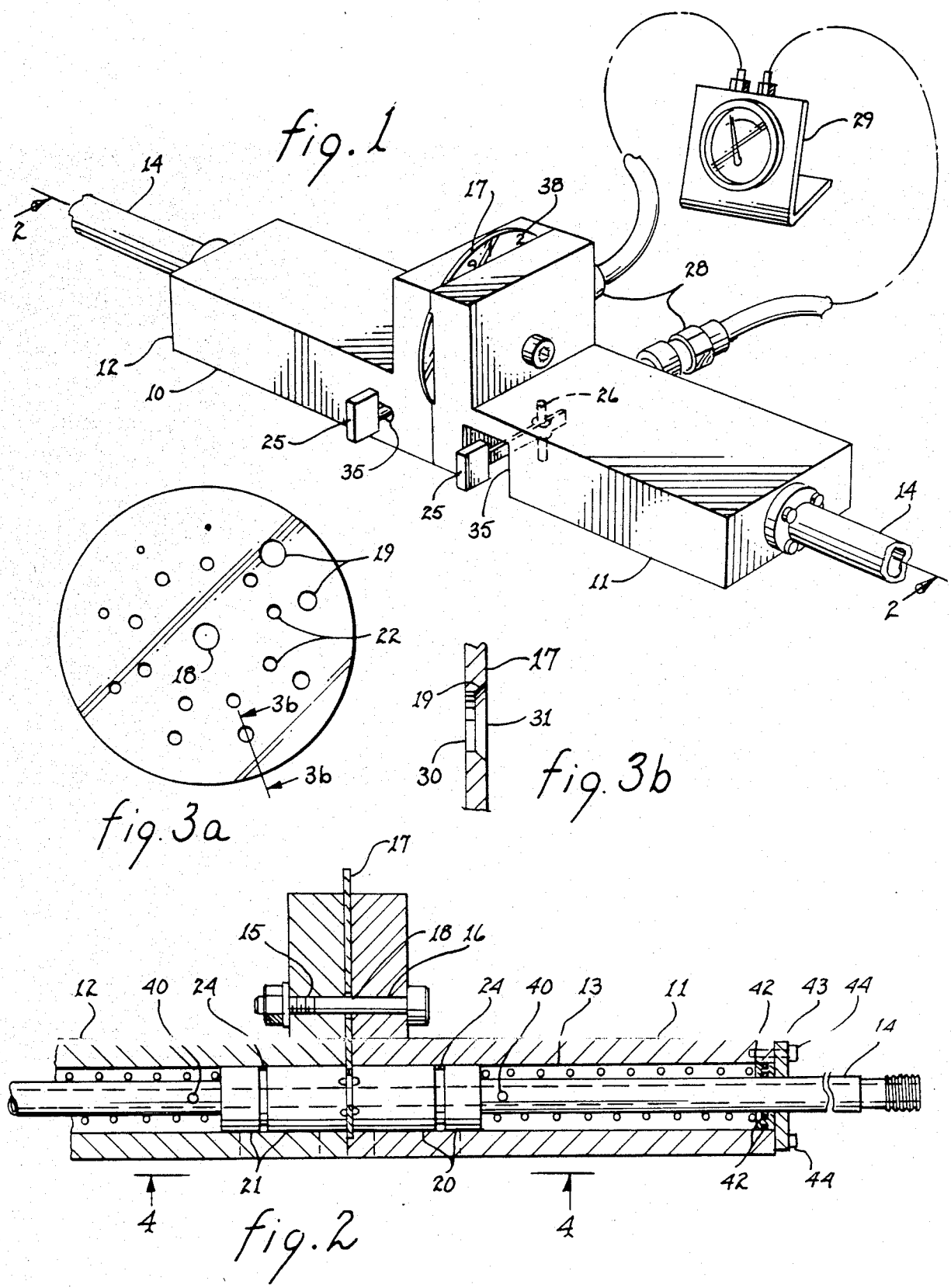

MULTIPLE ORIFICE FLOW MEASURING DEVICE

FIELD OF THE INVENTION

The invention relates generally to a multiple orifice flow measuring device for measuring the flow rate through pipes or conduits of gases such as natural gas.

DESCRIPTION OF THE PRIOR ART

The flow rate of gases flowing through pipes or other conduits can be measured by passing the flow through a constriction, commonly, an orifice, placed in the path of fluid flow, measuring the difference in pressure between the two sides of the orifice, and determining the flow rate by calculation. In fact, given the size of the orifice, the positive pressures and the differential pressure, the flow rate for a gas of known properties may often be taken from established and well known tables of data.

The orifice is generally a round hole substantially concentric with the pipe and located in a plate of hard and relatively thin metal. Most commonly, the plate is clamped between flanges interposed in the pipe or conduit through which the gas is flowing.

A single orifice is not adaptable to all conditions of fluid flow. An orifice small enough to produce a differential pressure capable of measurement at low flow rates will be too small to accommodate high flow rates; conversely, an orifice sufficiently large to accommodate a large flow rate will not provide a measurable pressure differential at very low flow rates. Therefore, a number of references disclose flow measuring devices which have interchangeable plates containing orifices of different diameters. In most such prior art devices it is necessary to loosen or remove bolts holding the flanges together to remove one plate and substitute another. The bolts on the flanges must then be re-tightened.

Generally, to change orifices in such devices, the flow of gas must be interrupted for a considerable length of time, obviously disrupting any operations dependent on the source of gas flow.

Other devices disclose a single plate having several orifices with different diameters. See, for example, U.S. Pat. No. 1,813,100 to Swindle and U.S. Pat. No. 3,136,341 to Walker, et al. To rotate the Swindle plate to a different orifice, three different nuts must be loosened to release the plate from position. The plate is then turned by a wrench and the nuts are re-tightened to prevent leakage. To move the Walker device to a new orifice, the disk is rotated by using a tool to turn a shaft on which the disk is mounted. On both the Swindle and Walker devices, a change in orifices can be accomplished without interrupting gas flow. However, the structure of the two devices is such that gas leaks may occur if the plate or disk is rotated while gas is flowing.

Therefore, presently available multiple orifice flow measuring devices either require interruption of gas flow for significant periods of time while changing orifices, or increase the possibility of a dangerous gas leak. Therefore, there is a need for a leak proof multiple orifice flow metering device which will accurately measure fluid flow rates with only minor interruptions in gas flow.

SUMMARY OF THE INVENTION

Briefly described, and in accordance with one embodiment, the invention provides a multiple orifice flow measuring device. The device includes a housing having a central passage and a shaft passage located above and parallel to the central passage. In the central passage is a pipe adapted to be connected to a gas flow line. Mounted in the shaft passage is a shaft, on which is rotatably mounted a disk having a plurality of orifices of various diameters spaced circumferentially about the disk. The orifices are selectively registerable in the flow passage of the pipe. Closely fitted around the pipe adjacent the disk is a piston having an annular recess. A spring located in the central passage between the piston and the end of the housing opposite the disk forces the piston against the disk, thereby maintaining the disk in position. A lever extends from outside the housing into the annular recess of the piston. Means are provided for pivotally mounting the lever to the housing so that when gas flow is briefly shut off and the outside end of the lever is moved towards the disk, the end of the lever located within the annular recess pushes the piston away from the disk thereby compressing the spring and releasing the disk for rotation to a different orifice.

It is an object of the present invention to provide a multiple orifice flow measuring device which accurately measures gas flow rates without a significant interruption of gas flow.

It is another object of the present invention to provide a multiple orifice flow measuring device which measures gas flow rates without creating a dangerous gas leak.

It is another object of the present invention to provide an uncomplicated and inexpensive multiple orifice flow measuring device.

Other objects, advantages and features of the present invention will become apparent from the following specification when taken in conjunction with the accompanying drawings.

BRIEF DESCRIPTION OF THE DRAWINGS

FIG. 1 is a perspective view of a multiple orifice flow measuring device of the present invention.

FIG. 2 is a close up cross sectional view taken on line 2—2 of FIG. 1.

FIG. 3A is a perspective view of the multiple orifice plate used in the flow measuring device of the present invention.

FIG. 3B is a close up cross sectional view taken on line 3B—3B of FIG. 3A.

DESCRIPTION OF THE PREFERRED EMBODIMENT

Figure 4:
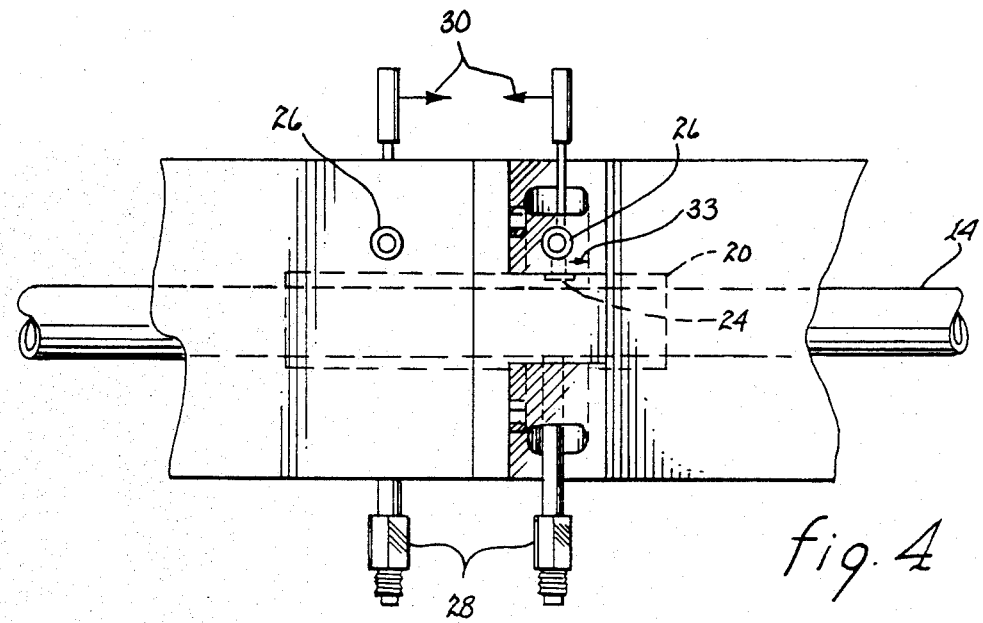
FIG. 4 is a bottom plan view taken on line 4—4 of FIG. 2.

Referring now to the drawings in detail, multiple orifice flow measuring device 10 includes inlet housing 11 and outlet housing 12 of suitable metal adapted to be connected in a gas line (not shown). Inlet housing 11 and outlet housing 12 include central passage 13 which contains pipe 14 having a straight constant diameter flow section for installation in the gas line. Pipe 14 contains apertures 40 to permit equalization of the pressure inside the pipe with the pressure inside central passage 13.

Central passage 13 is closed at the ends of inlet housing 11 and outlet housing 12 by inlet seal housing 40 and similar outlet seal housing (not shown), each of which seal housing contains a pair of O-rings 42. Inlet seal housing 40 is maintained in position by seal retainer 43 which is fixed to inlet housing 11 by a bolt 44. The outlet seal housing is similarly maintained in position.

Extending through upper portions of inlet housing 11 and outlet housing 12 parallel to central passage 13 is shaft passage 15 in which is mounted shaft 16. Rotatably fixed on shaft 15 is disk 17, preferably made of metal. As seen most clearly in FIG. 1, disk 17 is located between inlet housing 11 and outlet housing 12.

As can be seen by referring to FIGS. 2, 3A and 3B, disk 17 contains central opening 18 through which shaft 16 extends. Spaced circumferentially about disk 17 are variously sized orifices 19, to be selectively centered in pipe 14. As shown in detail in FIG. 3B, inlet diameter 30 of orifice 19 is smaller than outlet diameter 31. To prevent gas leakage from the edges of orifice 19, outlet diameter 31 matches the diameter of pipe 14. Adjacent each orifice 19 is an alignment opening 22 for use in positioning disk 17.

Figure 5:
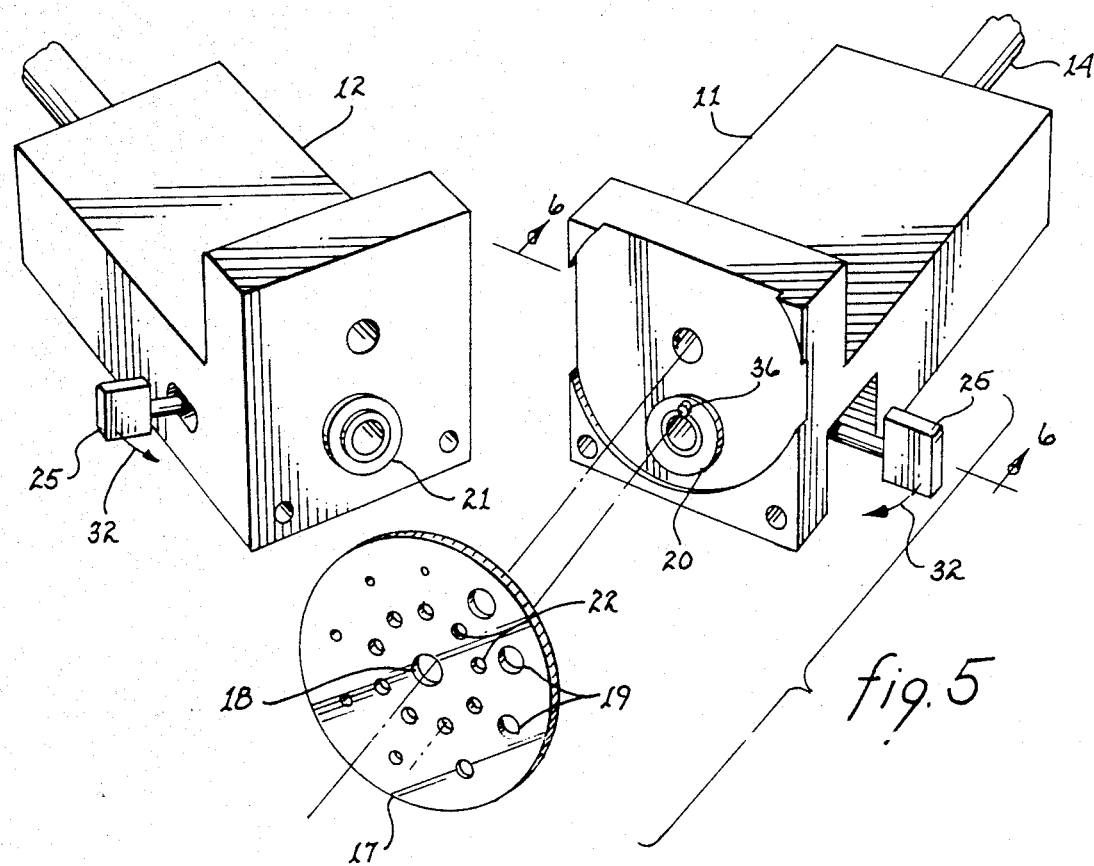
FIG. 5 is an expanded perspective view of the multiple orifice flow measuring device shown in FIG. 1.
Figure 8:
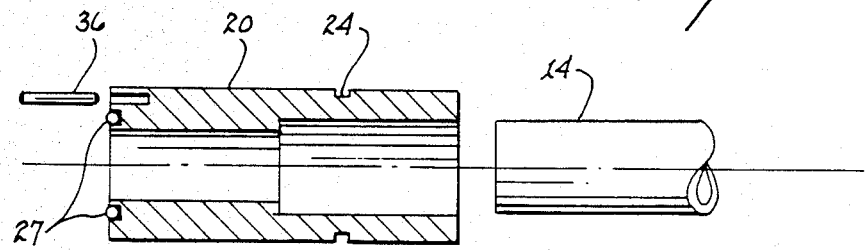
FIG. 8 is a sectional view taken on line 8—8 of FIG. 6.

Disk 17 is held in place by two different means: first, by means of the pressure exerted by gas entering central passage 13 through apertures 40, and second, by means of inlet piston 20 and outlet piston 21, which pistons closely fit around pipe 14 within central passage 13. Pistons 20 and 21 are forced against disk 17 by means of springs 23 positioned between the pistons and inlet seal housing 40 and the outlet seal housing (not shown), respectively. Alternatively, one piston and spring can be used to maintain disk 17 in position. Pistons 20 each contain an annular recess 24 for use in moving the pistons along 1 the pipe in a manner to be described. To protect against gas leakage near the pistons, "O" rings 27 are located on the end faces of the pistons 20 and 21 next to disk 17. As shown in FIGS. 5 and 8, one of the pistons, in this case, inlet piston 20, includes an alignment pin 36 for placement within an alignment opening 22 of disk 17, to ensure that the particular orifice 19 associated with the alignment opening exactly fits over pipe 14.

Figure 6:
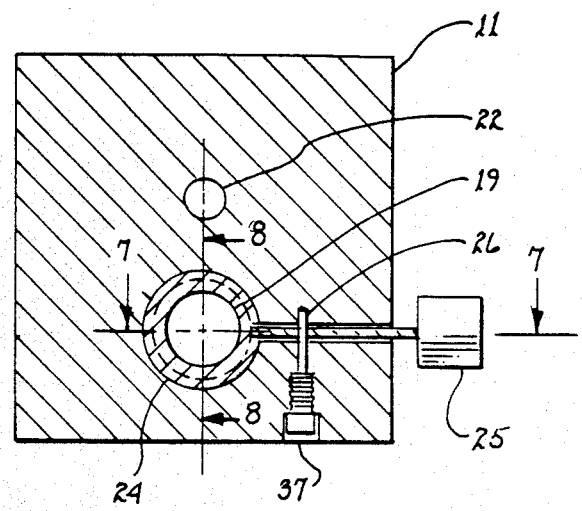
FIG. 6 is a sectional view taken on line 6—6 of FIG. 5.
Figure 7:
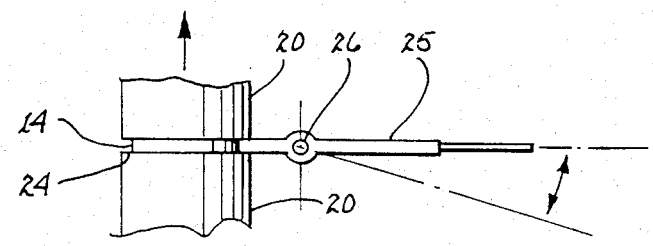
FIG. 7 is a sectional view taken on line 7—7 of FIG. 6.

A pair of levers 25 are positioned within slots 35 of inlet housing 11 and outlet housing 12. As shown in FIGS. 6 and 7, levers 25 protrude into annular recesses 24 of the inlet piston 20 and outlet piston 21. Levers 25 are held in place by pivot pins 26 which are secured to the base of inlet and outlet housings 11 and 12, respectively, by bolts 37.

To move disk 17 to a different orifice, the gas flow is shut off, thereby allowing gas from inside inlet housing 11 to flow back into pipe 14 so that little or no gas pressure is exerted against disk 17. Levers 25 are then squeezed together, thus moving each towards the disk, as shown by directional arrows 32 in FIGS. 1 and 5. Levers 25 then pivot on pivot pins 26 in the direction shown by arrow 33 of FIG. 4, thereby pushing pistons 20 and 21 backwards along pipe 14 away from disk 17, thus compressing springs 23. When pistons 20 and 21 are moved away from disk 17, it can be rotated on shaft 15 to a different orifice 19. When the new orifice 19 is properly placed across pipe 14, the alignment opening 22 associated with the selected orifice 19 engages alignment pin 36 of inlet piston 20, thus locking disk 17 into its new position. At that time, levers 25 can be released, causing them to pivot on pivot pins 26 back to their original position, thus releasing tension on springs 23 so that pistons 20 and 21 are forced forward along pipe 14 to their original positions against disk 17. The gas flow can then be turned on; the amount of time required to move levers 25 and rotate disk 17 to a new orifice is so small that interruption of gas flow is inconsequential.

FIG. 1 illustrates pressure taps 28 connected to pipe 14 on either side of disk 17. These taps 25 measure the gas pressure on both sides of disk 17. The measurements are relayed to pressure monitor 29 for use in subsequent calculations to determine gas flow rate. If the measured pressure differentials are too low for an accurate calculation of flow rate, the disk can be moved to a smaller orifice to produce a pressure differential capable of measurement.

If desired, means can be provided to indicate which orifice is in position across the flow passage of the pipe. Examples of such means include numerals or letters written on the exposed parts of disk 17, such as those indicated by reference number 38 on FIG. 1.

It is to be understood that the present invention is not limited to the particular construction and arrangement of parts disclosed and illustrated herein, but embraces all such modified forms thereof which are within the scope of the following claims.

I claim:

1. A multiple orifice flow measuring device comprising:
   a. a housing having a central passage and a shaft passage located above and parallel to the central passage;
   b. a pipe located in the central passage, the pipe adapted to be connected to a gas flow line;
   c. a shaft mounted in the shaft passage;
   d. a disk rotatably mounted on the shaft and having a plurality of orifices of various diameters spaced circumferentially about the disk and selectively registerable in the flow passage of the pipe;
   e. a piston movably positioned around the pipe in the central passage and positioned against the disk, the piston having a annular recess; and
   f. a spring located in the central passage between the piston and the end of the housing opposite the disk so that the spring forces the piston against the disk, thereby maintaining it in position;
   g. means for applying force to compress said spring and move said piston away from said disk, said force means extending from outside the housing into the piston annular recess.

2. The flow measuring device of claim 1, wherein the pipe has an aperture through which gas can escape into the central passage, thereby equalizing the gas pressure in the central passage with that in the pipe.

3. The flow measuring device of claim 1 wherein said force means comprises a lever pivotally connected to the housing so that when gas flow is shut off and the outside end of the lever is moved towards the disk, the end of the lever located within the annular recess pushes the piston away from the disk, compressing the spring, thereby releasing the disk for rotation to a different diameter orifice.

4. The flow measuring device of claim 1, wherein the disk contains a plurality of alignment openings, each of which is adjacent a corresponding orifice; and further comprising an alignment pin located on the piston for placement within an alignment opening to ensure that the particular orifice associated with the alignment opening is properly positioned across the flow passage of the pipe.

5. The flow measuring device of claim 1, wherein the diameter of each orifice expands from an inlet diameter to a diameter equal to the pipe diameter.

6. The flow measuring device of claim 1 further comprising means for measuring gas pressure in the pipe on both the inlet and outlet sides of the disk.

7. The measuring device of claim 1 further comprising means for indicating which orifice is positioned in the flow passage of the pipe.

8. The flow measuring device of claim 1 further comprising means for sealing the disk and housing to prevent gas leaks.

9. A multiple orifice flow measuring device comprising:
 a. inlet and outlet housings having a central passage and a shaft passage located above and parallel to the central passage;
 b. means for sealing the ends of the central passage;
 c. a pipe located in the central passage of the inlet and outlet housings, the pipe adapted to be connected to a gas flow line;
 d. a shaft mounted in the shaft passage;
 e. a disk rotatably mounted on the shaft between the inlet and outlet housings and having a plurality of orifices of various diameters spaced circumferentially about the disk and selectively registerable in the flow passage of the pipe;
 f. inlet and outlet pistons movably positioned around the pipe in the central passage on opposite sides of the disk, each piston having an annular recess;
 g. springs located in the central passage between the pistons and the central passage sealing means so that the springs force the pistons against the disk, thereby maintaining it in position;
 h. levers extending from outside the inlet and outlet housings, respectively, into the annular recesses of the pistons;
 i. pins for pivotally connecting each lever to the inlet and outlet housings so that when gas flow is shut off and the outside ends of the levers are moved together, the levers pivot on the pins, thereby causing the ends of the levers located within the annular recesses to push the pistons away from the disk, compress the springs, and release the disk for rotation to a different diameter orifice; and
 j. o-ring seals closely fitting around the pipe on opposite sides of the disk, for preventing gas leaks.

10. The flow measuring device of claim 9 wherein the inlet housing pipe has an aperture through which gas can escape into the inlet central housing, thereby equalizing the gas pressure in the inlet central passage with that in the inlet housing pipe.

11. The flow measuring device of claim 10 wherein the outlet housing pipe has an aperture through which gas can escape into the outlet central housing thereby equalizing the gas pressure in the outlet central passage with that in the outlet housing pipe.

12. The flow measuring device of claim 9, wherein the disk contains a plurality of alignment openings, each of which is adjacent a corresponding orifice; and further comprising an alignment pin located on one of the pistons for placement within an alignment opening to ensure that the particular orifice associated with the alignment opening is properly positioned across the flow passage of the pipe.

13. The flow measuring device of claim 9, wherein the diameter of each orifice expands from an inlet diameter on the inlet housing side of the disk, to a diameter equal to the pipe diameter on the outlet housing side of the disk.

14. The flow measuring device of claim 9 further comprising means for measuring gas pressure in the pipe on both the inlet and outlet sides of the disk.

15. The flow measuring device of claim 9 further comprising means for indicating which orifice is positioned in the flow passage of the pipe.

* * * * *